United States Patent Office 3,049,547
Patented Aug. 14, 1962

3,049,547
DIPYRIDYL QUATERNARY SALTS
Francis E. Cislak, Indianapolis, Ind., assignor to Reilly Tar & Chemical Corporation, Indianapolis, Ind., a corporation of Indiana
No Drawing. Filed May 31, 1961, Ser. No. 113,633
6 Claims. (Cl. 260—294.8)

This invention relates to a new class of chemical compounds and to the process of making them. More particularly, it relates to dipyridyl quaternary salts, which compounds may be represented by the following general formula:

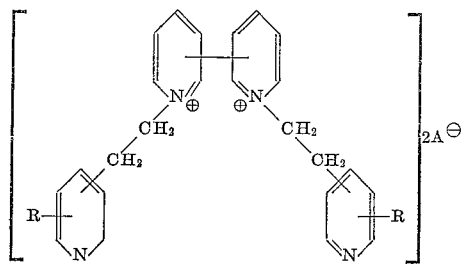

wherein R represents hydrogen or lower alkyl and A⊖ represents an inorganic acid anion.

In general the compounds of my invention may be prepared by reacting a vinylpyridine, or a compound which upon dehydration is converted into a vinylpyridine, with a dipyridyl salt. It is advantageous to conduct the reaction in a solvent.

The compounds of this invention are useful as fungacides, as ingredients in compositions for inhibiting the action of dilute sulfuric acid upon steel, as insecticides, as compounds of herbicidal compositions, as germicides, and as intermediates in organic syntheses.

My invention will be described more fully in connection with the following specific examples.

EXAMPLE 1
4,4'-Dipyridyl Di-Gamma-Pyridylethyl Chloride

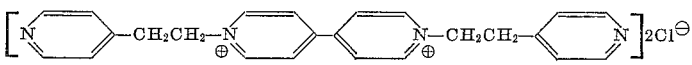

A solution of 23 parts of the dihydrochloride of 4,4'-dipyridyl in 200 parts of methanol is prepared in any convenient manner. While stirring this solution, 21 parts of 4-vinylpyridine is slowly added. After all of the 4-vinylpyridine has been added, the stirring is continued for about one to two hours longer. The mixture is allowed to stand in a refrigerator (40° F.) overnight. During such standing, crystals of 4,4'-dipyridyl di-gamma-pyridylethyl chloride crystallize from the solution. These crystals are separated from the mother liquor, as by filtration. The 4,4'-dipyridyl di-gamma-pyridylethyl chloride thus obtained is fairly pure and can be used as such for many purposes, if however a greater purity is desired, the above obtained product may be recrystallized from any suitable solvent, as for example acetone. The product is freely soluble in water but is not soluble in hydrocarbon solvents.

If it is desired to prepare a halide other than the chloride, I need only start with corresponding dihydrohalide of 4,4'-dipyridyl.

EXAMPLE 2
2,2'-Dipyridyl Di-Alpha-Pyridylethyl Hydrogen Sulfate

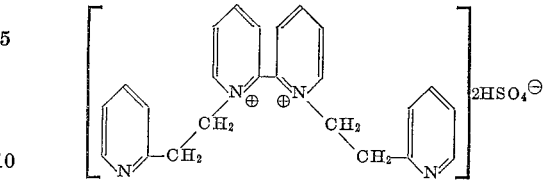

Thirty-two parts of 2,2'-dipyridyl is dissolved in about 600 parts of methanol. This solution is cooled to about 5° C. and while being maintained at this temperature, 40 parts of concentrated sulfuric acid is slowly added. Then while stirring the solution, 42 parts of 2-vinylpyridine is added and the mixture stirred for about three hours. Now most of the methanol, about 500 parts, is evaporated under vacuum and the residue is cooled to about 10° C. and allowed to stand overnight at this temperature. The 2,2'-dipyridyl di-alpha-pyridylethyl sulfate which crystallizes out, is separated from the mother liquor and washed with cold methanol. It is freely soluble in water, but is insoluble in hydrocarbons.

EXAMPLE 3
2,2'-Dipyridyl-Di[Beta'-Ethyl-Alpha-Pyridylethyl] Bromide

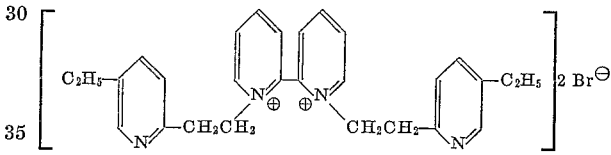

To a solution of 32 parts of the dihydrobromide of 2,2'-dipyridyl in 500 parts of methanol is added 30 parts of 2-vinyl-5-ethylpyridine. The mixture is stirred for several hours and then is allowed to stand overnight at about 5° C. The crystals of 2,2'-dipyridyl-di-[beta'-ethyl-alpha-pyridylethyl] bromide which crystallize from the solution are separated in any convenient manner, as by filtration. They are freely soluble in water, but are insoluble in hydrocarbon solvents such as benzene, toluene, or the like.

EXAMPLE 4
2,3'-Dipyridyl-Di-Alpha-Pyridylethyl Chloride

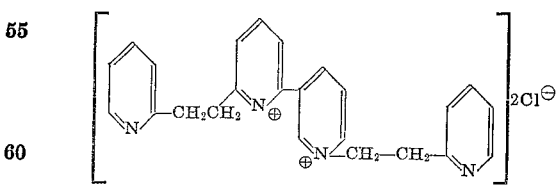

The procedure of Example 1 is employed with the exception that the dihydrochloride of 2,3'-dipyridyl is used in place of the dihydrochloride of 4,4'-dipyridyl and 2-vinylpyridine is used in place of 4-vinylpyridine.

EXAMPLE 5

*4,4'-Dipyridyl-Di-Gamma-Pyridylethyl Thiocyanate*

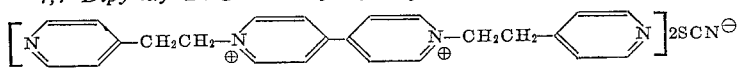

The procedure of Example 1 is employed with the exception that the dithiocyanate of 4,4'-dipyridyl is used instead of the dihydrochloride.

EXAMPLE 6

*2,2'-Dipyridyl Di-Gamma-Pyridylethyl Hydrogen Phosphate*

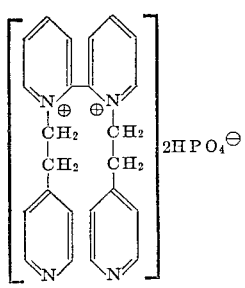

The procedure of Example 2 is employed with the exception that the di-hydrogen phosphate of 2,2'-dipyridyl is used in place of the dihydrogen sulfate and 4-vinylpyridine is used in place of the 2-vinylpyridine.

I claim as my invention:

1. The dipyridyl quaternary salts having the formula:

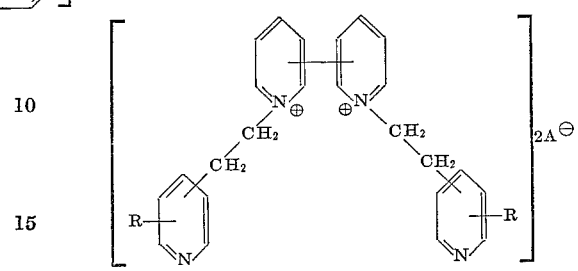

wherein R is a member of the group consisting of hydrogen and lower alkyl and $A^{\ominus}$ represents an inorganic acid anion.

2. The compound 4,4'-dipyridyl di-gamma-pyridylethyl halide.

3. The compound 2,2'-dipyridyl di-alpha-pyridyl-ethyl hydrogen sulfate.

4. The compound 4,4'-dipyridyl - di-gamma-pyridylethyl thiocyanate.

5. The compound 2,2'-dipyridyl-di-[beta'-ethyl-alpha-pyridylethyl] bromide.

6. The compound 2,2'-dipyridyl di-gamma-pyridylethyl hydrogen phosphate.

No references cited.